(12) United States Patent
Chen

(10) Patent No.: US 9,213,134 B2
(45) Date of Patent: Dec. 15, 2015

(54) ALIGNMENT FOR SPLICING MULTI-CORE OPTICAL FIBERS

(71) Applicant: Verizon Patent and Licensing Inc., Basking Ridge, NJ (US)

(72) Inventor: David Z. Chen, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 241 days.

(21) Appl. No.: 13/960,462

(22) Filed: Aug. 6, 2013

(65) Prior Publication Data

US 2015/0043878 A1 Feb. 12, 2015

(51) Int. Cl.
*G02B 6/036* (2006.01)
*G02B 6/02* (2006.01)
*B29D 11/00* (2006.01)

(52) U.S. Cl.
CPC ...... *G02B 6/02042* (2013.01); *B29D 11/00663* (2013.01)

(58) Field of Classification Search
None
See application file for complete search history.

(56) References Cited

U.S. PATENT DOCUMENTS

| | | | | |
|---|---|---|---|---|
| 5,982,967 A | * | 11/1999 | Mathis et al. | 385/102 |
| 6,343,172 B1 | * | 1/2002 | Schiestle et al. | 385/101 |
| 6,347,172 B1 | * | 2/2002 | Keller et al. | 385/102 |
| 7,048,446 B2 | * | 5/2006 | Rondeau et al. | 385/54 |
| 7,876,495 B1 | * | 1/2011 | Minelly | 359/341.1 |
| 8,620,123 B2 | * | 12/2013 | Dean et al. | 385/102 |
| 2004/0184739 A1 | * | 9/2004 | Rondeau et al. | 385/54 |
| 2006/0029346 A1 | * | 2/2006 | Ramachandran | 385/124 |
| 2015/0055923 A1 | * | 2/2015 | Saito et al. | 385/126 |

* cited by examiner

*Primary Examiner* — Sung Pak

(57) ABSTRACT

A multi-core optical fiber may include a cladding with a cross section having a central region and an outside diameter. Multiple transmission cores are arranged symmetrically within the central region of the cladding, extending parallel to a central axis of the multi-core optical fiber. Multiple alignment cores are arranged within the cladding, extending parallel to the central axis of the multi-core optical fiber and near the outside diameter of the cladding so that each of the multiple alignment cores are visible through a side view of the cladding. Ends of similarly configured multi-core optical fibers may be mated and aligned. Alignment cores of a first multi-core optical fiber may be aligned with alignment cores of a second multi-core optical fiber using a side view of the mating interface. Aligning the alignment cores causes multiple transmission cores with the multi-core optical fibers to also align.

20 Claims, 9 Drawing Sheets

ALIGNMENT FOR SPLICING MULTI-CORE OPTICAL FIBERS

BACKGROUND

Fiber optic cables are used for providing telecommunication services to business and residential locations. A multi-core optical fiber has a plurality of cores, each of which functions independently as an optical waveguide. In connecting optical fibers together, the axes of the cores must be aligned with each other to minimize connection loss. The optical fibers are aligned and fixed on a splice. Fibers may be fixed in place using a mechanical connector and/or a bonding medium, such as an ultraviolet-curing adhesive agent. However, achieving proper alignment of each individual core in a multi-core optical fiber remains a challenging operation, particularly as a field operation for technicians.

DETAILED DESCRIPTION OF PREFERRED EMBODIMENTS

The following detailed description refers to the accompanying drawings. The same reference numbers in different drawings may identify the same or similar elements.

Systems and methods described herein may provide for easier alignment of multi-core optical fibers. The multi-core optical fibers may include multiple transmission cores that are fused into a single fiber along with colored alignment cores inserted with a common cladding. The colored alignment cores permit visible alignment of mated fiber ends. In one implementation, each transmission core may be included within a trench area. The colored alignment cores may be configured in a generally parallel orientation to the transmission cores and near the outer circumference of the fiber's cladding. In a production environment, each of the colored alignment cores may be positioned with consistent spacing relative to the transmission cores and to other colored alignment cores within the multi-core optical fiber.

When splicing two multi-core optical fibers, according to implementations described herein, the colored alignment cores may be visible through the surface of the common cladding (from a side view) to permit visible alignment at the interface of the two multi-core optical fibers. In one implementation, aligning the alignment cores of the two multi-core optical fibers causes the transmission cores of the two multi-core optical fibers to also align.

Figure 1:
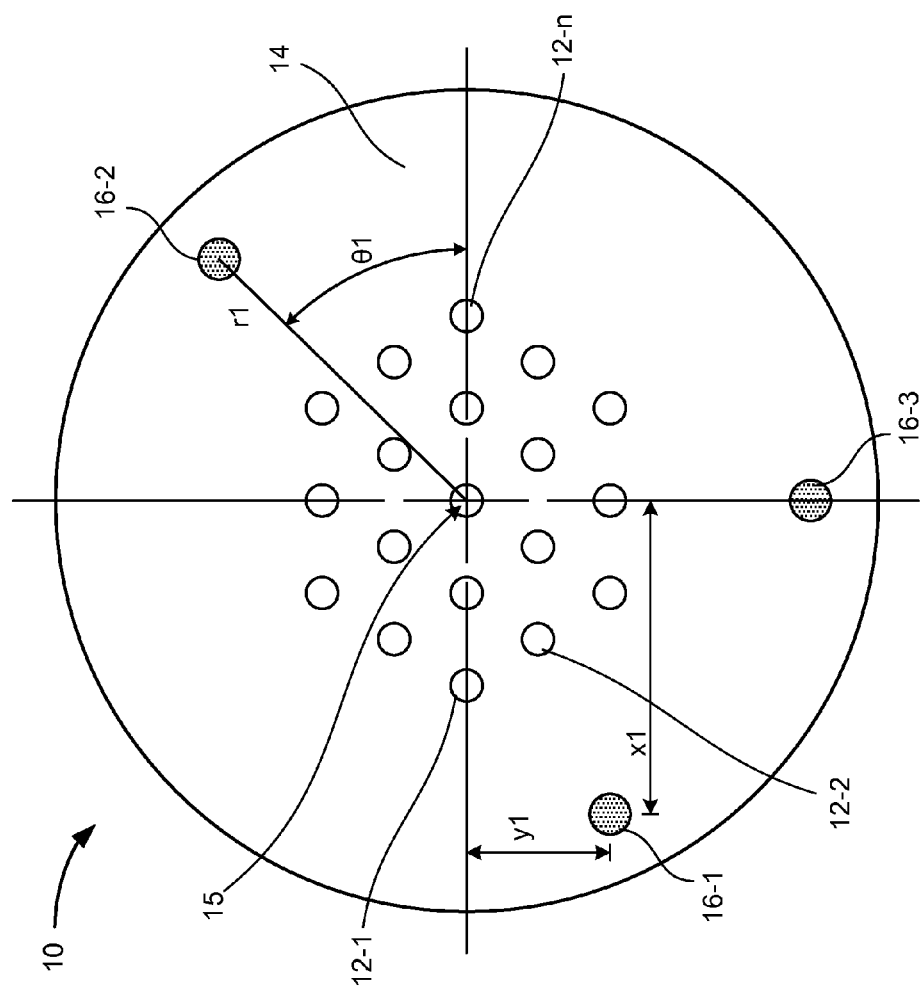
FIG. 1 is a schematic cross-sectional diagram of a multi-core optical fiber according to an implementation described herein.

FIG. 1 is a schematic cross-sectional diagram of a multi-core optical fiber 10 according to an implementation described herein. Multi-core optical fiber 10 may include multiple transmission cores 12-1, 12-2, . . . 12-$n$ (referred to herein collectively as "transmission cores 12" and generically as "transmission core 12") included within a common cladding 14. Common cladding 14 may define a longitudinal strand with a central axis 15 for multi-core optical fiber 10. In one configuration, as shown in FIG. 1, nineteen transmission cores 12 may be spaced from each other in a near-symmetrical arrangement (e.g., about central axis 15 of the multi-core optical fiber 10). In other configurations, a different number and arrangement of transmission cores 12 may be included within multi-core optical fibers 10. For example, in other implementations, multi-core optical fiber 10 may include six, seven, twelve, eighty-five, or another number of symmetrically-arranged or non-symmetrically-arranged transmission cores 12. Alignment cores 16-1, 16-2, and 16-3 (referred to herein collectively as "alignment cores 16" and generically as "alignment core 16") may be positioned within common cladding 14 near the outside surface of multi-core optical fiber 10.

In some implementations, multi-core optical fiber 10 may include a coating, sheath, or jacket (not shown) to protect transmission cores 12, common cladding 14, and alignment cores 16. This coating, sheath, or jacket would typically be removed prior to a connecting/splicing operation.

Each transmission core 12 may act as a waveguide to transmit light between ends of transmission core 12. Transmission core 12 may include a refractive index that is higher than that of common cladding 14. For example, transmission core 12 may include pure silica glass or silica glass doped with one or more materials to raise the refractive index, such as Germanium dioxide or aluminum oxide.

Cladding 14 may generally surround each core 12 in a void-free manner and include a refractive index that is lower than that of transmission core 12. For example, cladding 14 may be formed from silica doped with one or more materials to lower the refractive index, such as boron trioxide or fluorine. Cladding 14 may generally work to confine light within each core 12 for improved light propagation through each core 12.

Connecting one end of a multi-core optical fiber 10 with another end of a multi-core optical fiber 10 may typically be performed by techniques such as fusion splicing or mechanical splicing. Fusing splicing welds optical fibers together, while mechanical splicing employs a connector to hold the ends together. In either type of splice, accurate alignment of transmission cores 12 is needed to minimize connection losses.

Alignment cores 16 may include a colored glass material that is visibly distinct from that of transmission cores 12 and cladding 14. For example, alignment cores 16 may include silica or another glass material that is tinted to provide visibility of cores 16 through an outer surface of cladding 14. For example, alignment cores 16 may include red, amber, blue, green, or another color glass. Each of alignment cores 16 may be positioned in a precise, consistent location relative to central axis 15 and transmission cores 12. For example, as illustrated with alignment core 16-2 of FIG. 1, the center of alignment cores 16 may be placed at a particular radius, r1, and angle, θ1, relative to central axis 15. Alternatively, as illustrated with alignment core 16-1 of FIG. 1, the center of alignment cores 16 may be positioned at a fixed horizontal distance (x1) and vertical distance (y1) relative to central axis 15.

In one implementation, transmission cores 12 and alignment cores 16 may be positioned within cladding 14 to provide rotational symmetry about central axis 15. In another implementation, transmission cores 12 and alignment cores 16 may be positioned within cladding 14 to provide symmetry to flip multi-core optical fiber 10 vertically or horizontally. The cross sectional positions of transmission cores 12 and alignment cores 16, relative to central axis 15 and relative to each other, are configured to be consistent along the entire length of multi-core optical fiber 10 and across multiple multi-core optical fibers 10. The symmetrical arrangement of alignment cores 16 permits alignment of transmission cores 12/alignment cores 16 with transmission cores 12/alignment cores 16 in another multi-core optical fiber 10 in multiple orientations.

In still another implementation, alignment cores 16 may be placed in an asymmetrical arrangement around transmission cores 12. For example, as shown in FIG. 1, the arrangement of transmission cores 12 lacks radial symmetry. Alignment cores 16 may be positioned asymmetrically near the outside diameter of multi-core optical fiber 10 so that alignment of alignment cores 16 with alignment cores 16 in another multi-core optical fiber 10 would also cause all of transmission cores 12 to also align in only one orientation.

Figure 2:
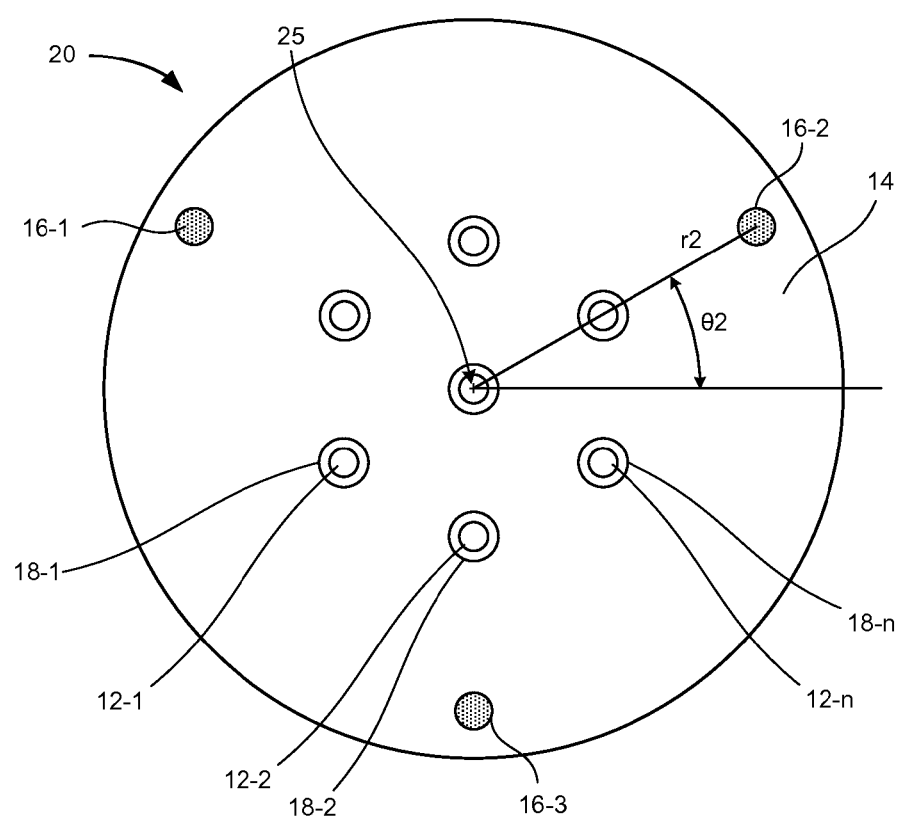
FIG. 2 is a schematic cross-sectional diagram of a multi-core optical fiber according to another implementation described herein.

FIG. 2 is a schematic cross-sectional diagram of another multi-core optical fiber 20 according to an implementation described herein. Multi-core optical fiber 20 may include multiple transmission cores 12 with trench layers 18-1, 18-2, ... 18-n (referred to herein collectively as "trench layers 18" and generically as "trench layer 18") within a common cladding 14. In the configuration shown in FIG. 2, seven transmission cores 12 and trench layers 18 may be included in a radial symmetric pattern (e.g., about a central axis 25 of multi-core optical fiber 20). Similar to the configuration of multi-core optical fiber 10 in FIG. 1, alignment cores 16 of FIG. 2 may be positioned within common cladding 14 near the surface of multi-core optical fiber 20.

Alignment cores 16 may be positioned in precise locations relative to transmission cores 12 and central axis 25 such that alignment of alignment cores 16 (e.g., with an identical multi-core optical fiber 20) would result in alignment of the corresponding transmission cores 12. For example, as shown in FIG. 2, the center of alignment core 16-2 may be positioned at a particular radius, r2, and angle, θ2, relative to central axis 25. As described above with respect to FIG. 1, other symmetrical or asymmetrical arrangements of transmission cores 12/alignment cores 16 may be used.

Referring to FIG. 2, a trench layer 18 is provided along the circumference of each respective transmission core 12. Each trench layer 18 may have a refractive index that is higher than that of both common cladding 14 and transmission core 12. Material for trench layer may include, for example, pure silica glass or silica glass doped with one or more materials to raise the refractive index above that of transmission core 12. As described further herein, trench layer 18 will force radiation leaks from slightly misaligned cores 12 to be redirected back into cores 12. More particularly, trench layers 18 may prevent leaky modes and cross-talk between transmission cores 12.

Figure 3:
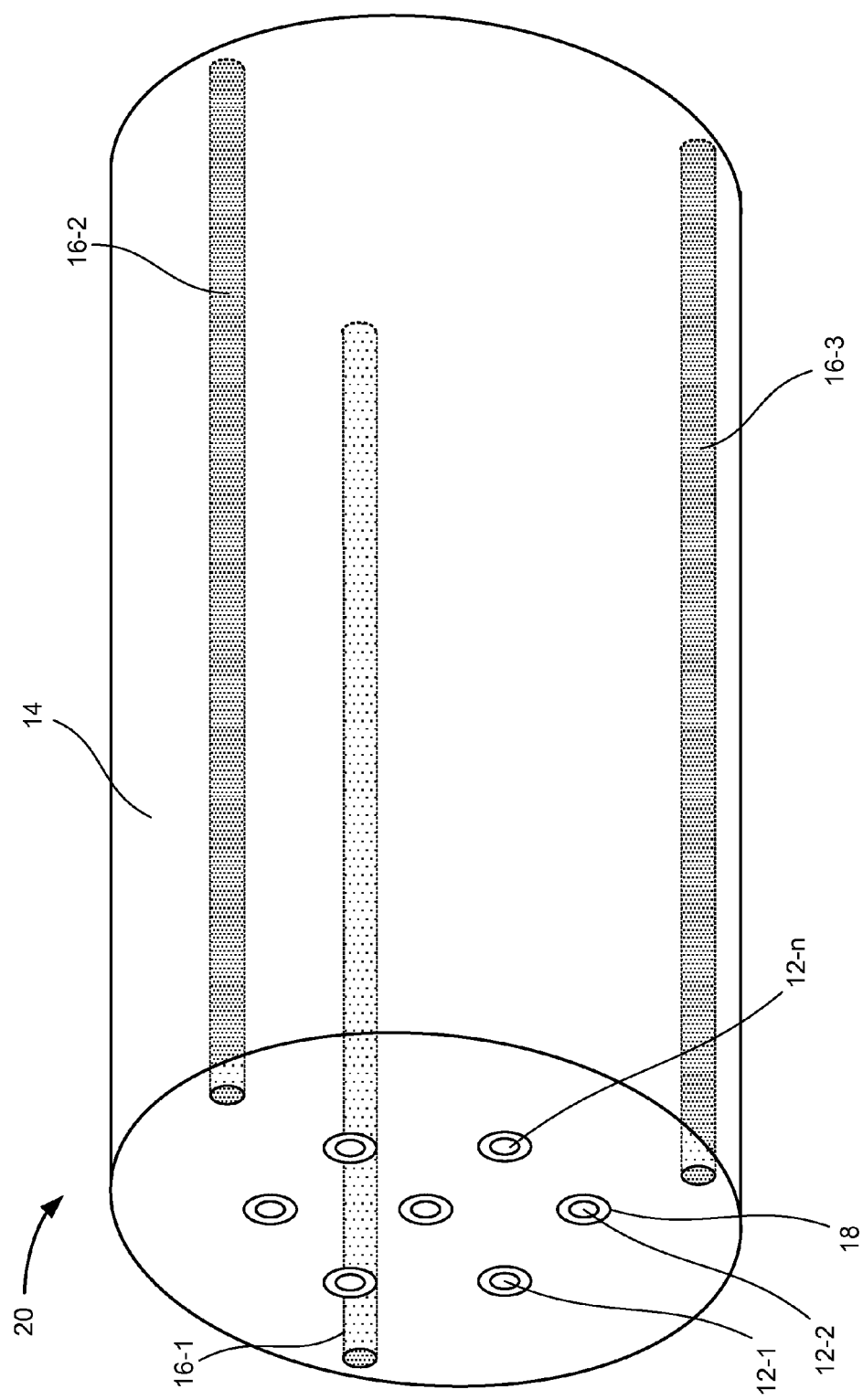
FIG. 3 is a schematic isometric view of the multi-core optical fiber of FIG. 2.

FIG. 3 is a schematic isometric view of multi-core optical fiber 20. As shown in FIGS. 2 and 3, alignment cores 16 may be located near the outer surface of cladding 14 to provide visibility by a technician and/or machine. Alignment cores 16 may generally only be seen when viewed through a small depth of the side of multi-core optical fiber 20. Thus, in the perspective of FIG. 3, the length of alignment core 16-1 would not be clearly visible from the observation perspective of multi-core optical fiber 20, while the length of alignment cores 16-2 and 16-3 would be visible on the observed side of multi-core optical fiber 20.

Figure 4:
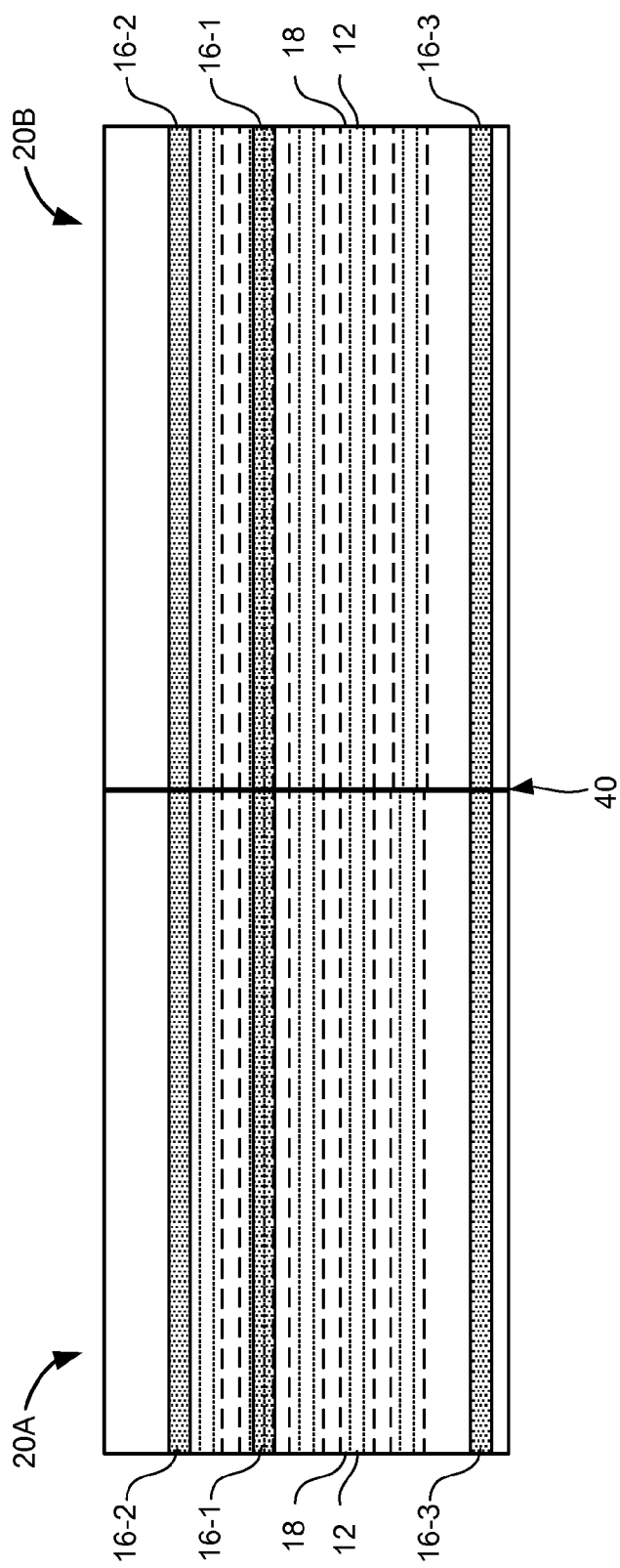
FIG. 4 is schematic side view of two multi-core optical fibers of FIG. 2 in a spliced configuration.

FIG. 4 is schematic side view of two multi-core optical fibers 20 in a spliced configuration. More particularly, a first optical fiber 20A may be connected to a second optical fiber 20B. Optical fiber 20A may be connected to optical fiber 20B using, for example, a mechanical connector (not shown), fusion, etc. Alignment of the multiple transmission cores 12 requires proper orientation of the ends of optical fiber 20A and optical fiber 20B at an interface 40. Alignment cores 16 at interface 40 are visible from side views of optical fiber 20A and optical fiber 20B. The respective alignment cores 16 may be aligned from the side views while maintaining an end-to-end contact of optical fiber 20A and optical fiber 20B at interface 40. Alignment cores 16 may be aligned using visual and/or mechanical inspection, manually or via a device specifically designed to detect alignment cores 16.

Proper positions of the respective alignment cores 16 in optical fiber 20A and optical fiber 20B may ensure corresponding alignment of transmission cores 12 at interface 40. By contrast, with conventional multi-core optical fibers, an initial orientation may be made by visually inspecting an end of each multi-core fiber prior to contacting the ends. But subsequent alignment of the cores within the multi-core optical fibers is accomplished without direct visual guidance when the ends are in contact. Instead, alignment of the cores may be performed, for example, by measuring connection losses by passing light through the interface between the optical fiber segments.

Trench layer 18 may generally enlarge the effective area of transmission cores 12 at interface 40. As discussed above, trench layer 18 surrounds each transmission core 12 to reflect light back into core 12. In some implementations (not shown), trench layer 18 and transmission core 12 may be separated by one or more other layers. Trench layer 18 may reflect light from slightly misaligned cores 12 (e.g., at interface 40) back into one of the cores 12.

Figure 5:
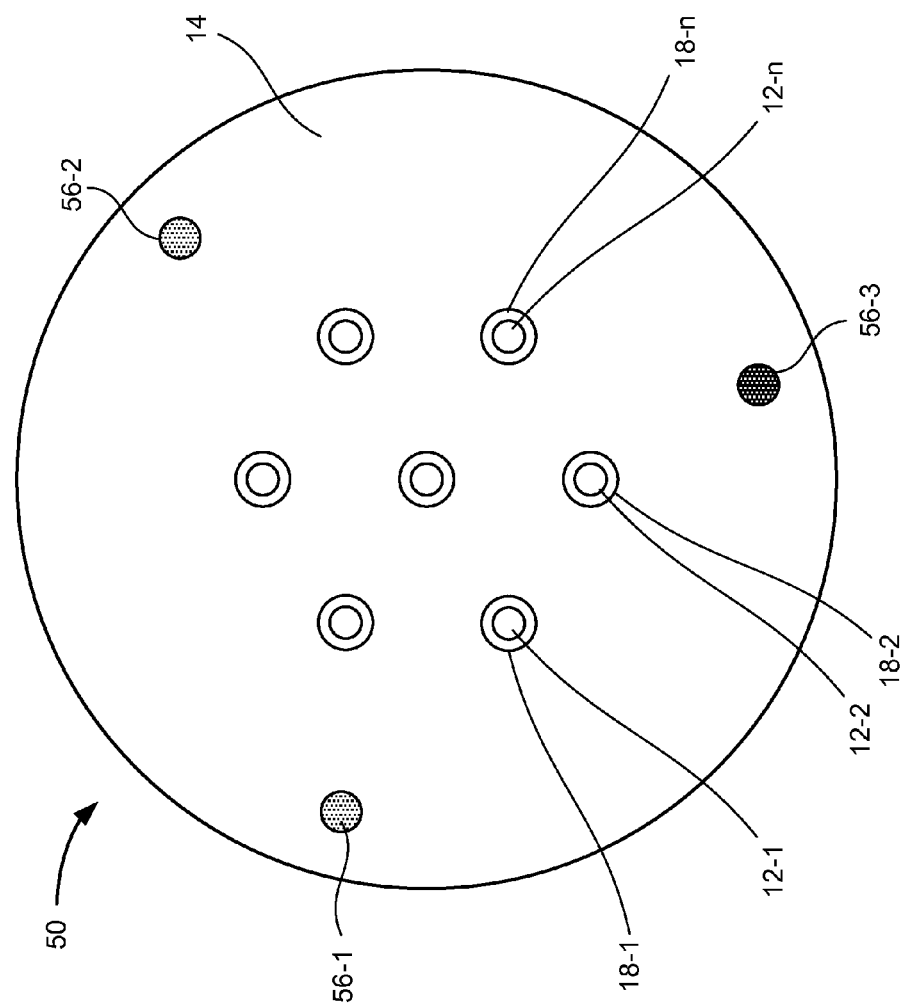
FIG. 5 is a schematic cross-sectional diagram of a multi-core optical fiber according to another implementation described herein.

FIG. 5 is a schematic cross-sectional diagram of a multi-core optical fiber 50, according to another implementation described herein. Multi-core optical fiber 50 may include multiple transmission cores 12 with trench layers 18 and alignment cores 56-1, 56-2, and 56-3 (referred to herein collectively as "alignment cores 56" and generically as "alignment core 56") within a common cladding 14. Similar to the configuration of alignment cores 16 in multi-core optical fiber 20 of FIG. 2, alignment cores 56 of FIG. 5 may be positioned within common cladding 14 near the surface of multi-core optical fiber 20. Each of alignment cores 56 may include a colored glass material that is visibly distinct from that of cores 12 and cladding 14. Additionally, at least one of alignment cores 56 may be visibly distinct from the other of alignment cores 56. For example, alignment cores 56 may include silica or another glass material that is tinted to provide different colors of cores 56 and visibility though an outer surface of cladding 14.

The differently colored alignment cores 56 may provide a distinguishing characteristic to permit matching/orientation of particular transmission cores 12 of different multi-core optical fibers 50. In another implementation, one or more of alignment cores 56 may be provided with different cross-sectional diameters to be employed as a distinguishing characteristic in a similar manner to the different colors.

Figure 6:
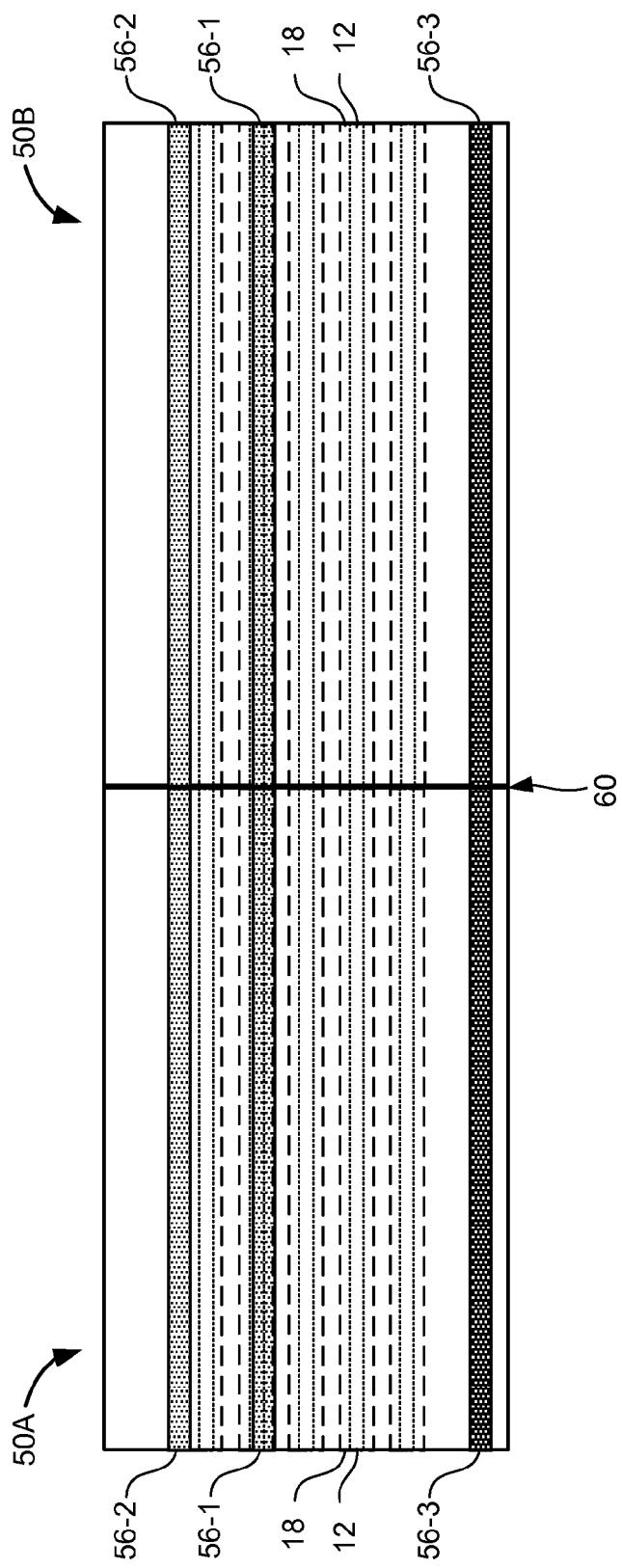
FIG. 6 is schematic side view of two multi-core optical fibers of FIG. 5 in a spliced configuration.

FIG. 6 is schematic side view of two multi-core optical fibers 50 in a spliced configuration. More particularly, a first optical fiber 50A may be connected to a second optical fiber 50B. Optical fiber 50A may be connected to optical fiber 50B using, for example, a mechanical connector (not shown), fusion, etc. Assuming transmission cores 12 of optical fiber 50A and transmission cores 12 of optical fiber 50B are required to be in a keyed orientation, alignment cores 56 may be color-matched at an interface 60 to ensure correct orientation. The different colors of alignment cores 56 may be visible from a side view of optical fiber 50A and optical fiber 50B to confirm a correct orientation and permit alignment of corresponding transmission cores 12. The respective alignment cores 56 may be aligned from a side view while maintaining an end-to-end contact of optical fiber 50A and optical fiber 50B at interface 60. Alignment cores 56 may be aligned using visual and/or mechanical inspection, manually or via a device specifically designed to detect alignment cores 56.

In some implementations, after the alignment cores 56 are aligned, transmission cores 12 may be further aligned to arrive at a configuration in which the connection losses of light that passes that through the interface between the optical fiber segments 50A and 50B are minimized.

Figure 7:
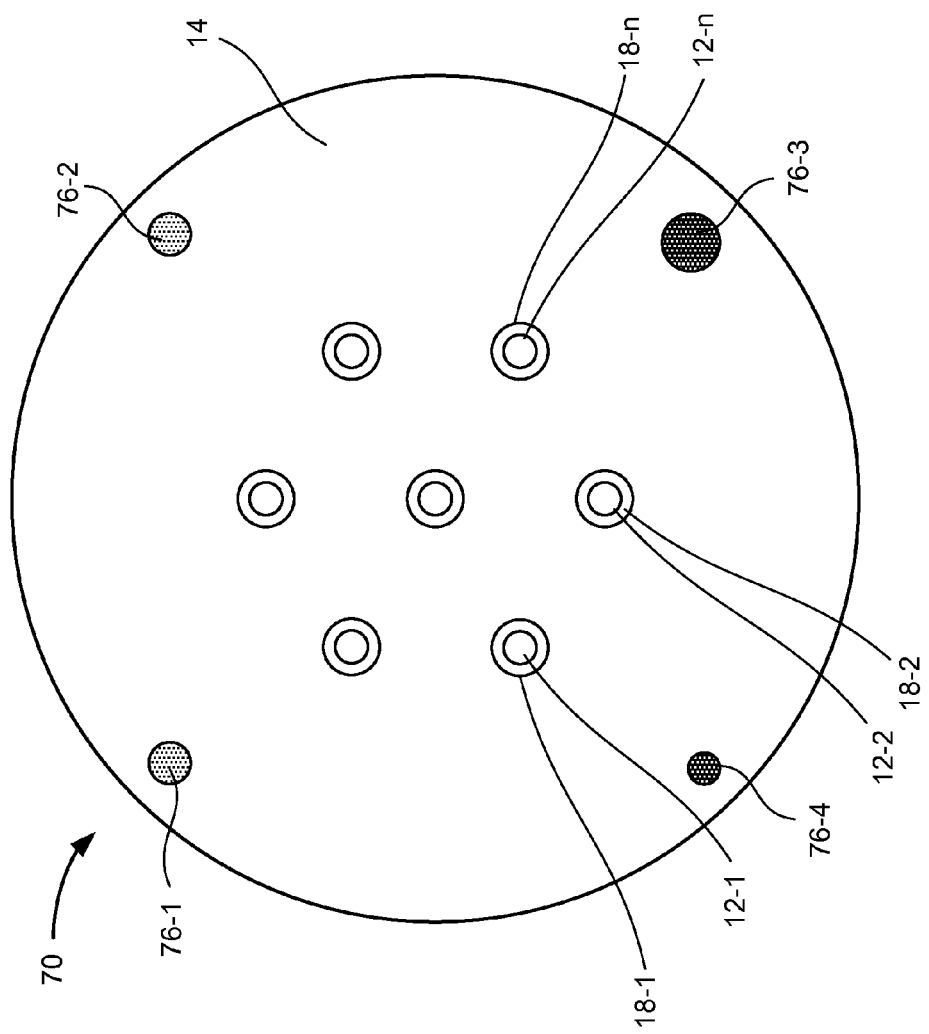
FIG. 7 is a schematic cross-sectional diagram of a multi-core optical fiber according to another implementation described herein.

FIG. 7 is a schematic cross-sectional diagram of a multi-core optical fiber 70, according to another implementation described herein. Multi-core optical fiber 70 may include multiple transmission cores 12 with trench layers 18 and alignment cores 76-1, 76-2, and 76-3 (referred to herein collectively as "alignment cores 76" and generically as "alignment core 76") within a common cladding 14. Similar to the configuration of alignment cores 16 in multi-core optical fiber 20 of FIG. 2, alignment cores 76 of FIG. 7 may be positioned within common cladding 14 near the surface of multi-core optical fiber 20. Each of alignment cores 76 may include a colored glass material that is visibly distinct from that of cores 12 and cladding 14 and provides for visibility though an outer surface of cladding 14.

Additionally, at least one of alignment cores 76 may have a different cross-sectional diameter than the other of alignment cores 76. For example, as shown in FIG. 7, alignment cores 76-3 may have a larger diameter than alignment cores 76-1 and 76-2, while alignment core 76-4 may have a smaller diameter than alignment cores 76-1 and 76-2. In another implementation, one or more of alignment cores 76 may also have a different color than the other of alignment cores 76. Different color/diameter alignment cores 76 may also have different functions. For example, alignment core 76-4 may be used for an initial keying/orientation of a splice, while alignment cores 76-1, 76-2, and 76-3 may be used for final alignment. Although not illustrated, multi-core optical fibers disclosed herein may have fewer alignment cores (e.g., one or two).

Figure 8:
FIG. 8 is a flow chart of a process for forming a multi-core optical fiber according to an implementation described herein.

FIG. 8 is a flow chart of a process for forming a multi-core optical fiber according to an implementation described herein. Process 800 may include providing a glass rod of cladding material (block 810). For example, a silica rod doped with boron trioxide or fluorine (or another element to lower the refractive index) may be provided as a starting component for a preform optical fiber blank. In one implementation, for example, the glass rod of cladding material may have a diameter (e.g., a 10 inch dia.) much larger than that of the desired multi-core optical fiber.

Process 800 may further include drilling axial holes in a central region of the glass rod for multiple transmission cores (block 820), and drilling axial holes near an outer circumference of glass rod for multiple alignment cores (block 830). For example, multiple holes (e.g., corresponding to a desired number of transmission cores) that are sized to receive a rod of transmission core material may be drilled into the cladding material rod parallel to a central axis and near the center of the cladding material rod. In another implementation, a single larger hole may be drilled along the central axis of the cladding material rod to receive multiple transmission core rods (e.g., with additional cladding and/or trenching on each transmission core rod). Additionally, multiple holes (e.g., corresponding to a desired number of alignment cores) that are sized to receive a rod of alignment core material (e.g., colored silica glass) may be drilled into the cladding material rod parallel to the central axis and near the circumference of the cladding material rod. In one implementation, holes drilled for the alignment core rods may be, for example, about one-half inch diameter. In another implementation, holes drilled for the alignment core rods may be of differing diameters.

Process 800 may also include inserting multiple transmission cores into the axial holes in a central region (block 840) and inserting multiple alignment cores into the axial holes near an outer circumference (block 850). For example, rods of transmission core material (e.g., pure silica glass, or silica glass doped with Germanium dioxide or aluminum oxide to raise the refractive index) may be inserted into the holes near the center of the cladding material rod. Similarly, rods of alignment core material (e.g., colored silica glass that is visually distinct from the cladding material and/or transmission core material) may be inserted into the holes near the circumference of the cladding material rod.

Process 800 may further include drawing fiber so as to allow multiple alignment cores to be visible through cladding material from a side view (block 860). For example, the optical fiber blank (including the cladding material, the transmission core rods, and the alignment core rods) may be drawn in a known manner to achieve a desired transmission core diameter of, for example, 125 microns (e.g., for each of transmission cores 12). In one implementation, the drawing operation may include loading the optical fiber blank into a fiber drawing tower and heating it to a melting temperature so that a leading tip of the optical fiber blank drops vertically to form a multicore optical fiber of the required profile. The resultant multicore optical fiber may then undergo additional coating and/or curing processes.

Figure 9:
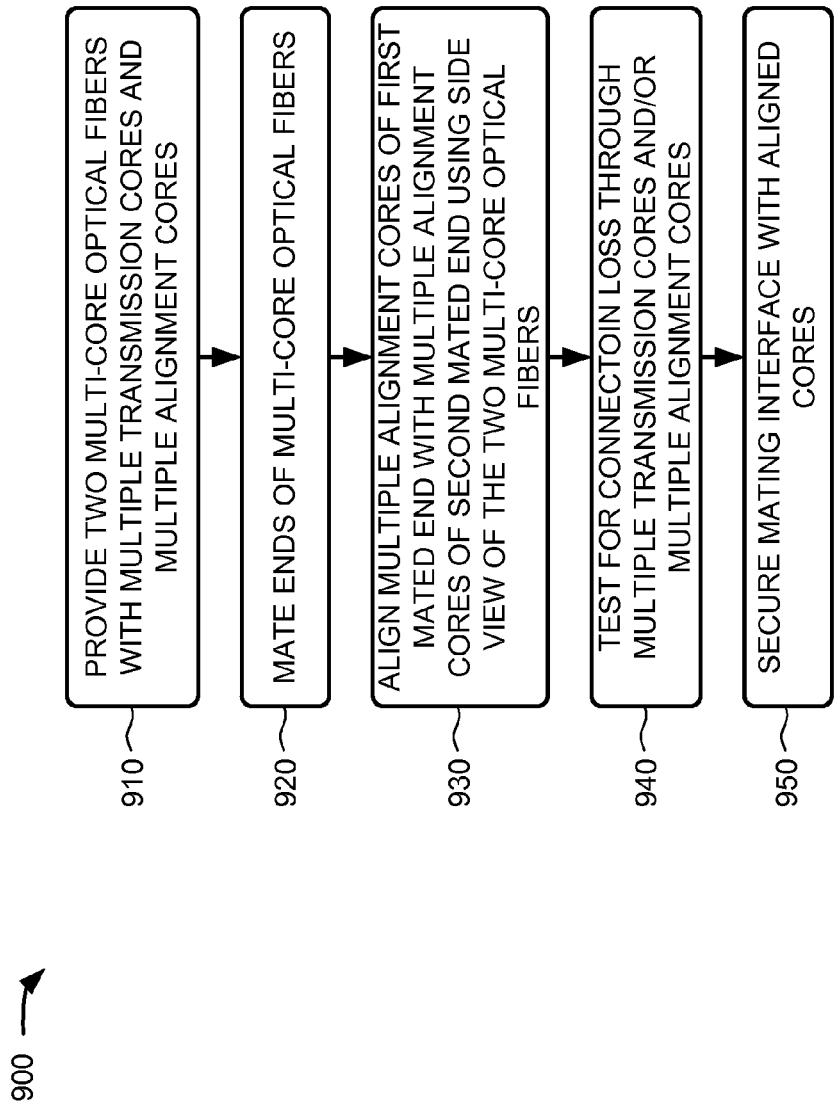
FIG. 9 is a flow chart of a process for aligning two multi-core optical fibers according to an implementation described herein.

FIG. 9 is a flow chart of a process for aligning two multi-core optical fibers according to an implementation described herein. Process 900 may include providing two multi-core optical fibers with multiple transmission cores and multiple alignment cores (block 910) and mating a first end with a second end of the multi-core optical fibers (block 920). For example, referring to FIGS. 2-4, a set of multi-core optical fibers (e.g., multi-core optical fibers 20A and 20B) may be placed together so that ends of the multi-core optical fibers form a mating interface (e.g., interface 40).

Process 900 may also include aligning the multiple alignment cores of the first mated end with multiple alignment cores of second mated end using a side view of the two multi-core optical fibers (block 930). For example, as shown in FIG. 4, alignment cores 16 in multi-core optical fibers 20A and 20B may be observed from the side view and adjusted while maintaining mating interface 40. Alignment of alignment cores 16 may be observed/performed using a machine and/or magnification devices.

Process 900 may further include testing for connection loss through multiple transmission cores and/or multiple alignment cores (block 940) and securing the mating interface with the aligned multiple transmission cores and multiple alignment cores (block 950). For example, referring to the configuration of FIG. 4, in one implementation, the connection performance of the aligned multi-core optical fibers 20 may be verified by measuring connection losses of light passed through the interface 40. Light may be measured through transmission cores 12 and/or alignment cores 16. Alternatively, one of the fibers 20 may be slowly turned/rotated with respect to the other fiber 20 until the connection loss is minimized.

As described above, systems and methods may provide for easier alignment of multi-core optical fibers. A multi-core optical fiber may include a cladding with a cross section having a central region and an outside diameter. Multiple transmission cores may be arranged symmetrically within the central region of the cladding and may extend parallel to the central axis of the multi-core fiber. Multiple alignment cores are arranged within the cladding, extending parallel to the central axis of the multi-core fiber and near the outside diameter of the cladding, so as to permit visibility of each of the multiple alignment cores through a side view of the cladding. Ends of similarly configured multi-core optical fibers may be mated and aligned. First multiple alignment cores of a first multi-core optical fiber may be aligned with second multiple alignment cores of a second multi-core optical fiber using a side view of the mating interface. Aligning the first multiple alignment cores and the second multiple alignment cores causes multiple transmission cores with the multi-core optical fibers to also align.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 9, the order of the blocks may be modified in other implementations. Further, non-dependent blocks may be performed in parallel.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A multi-core optical fiber, comprising:
    a cladding that includes a cross section with a central region and an outside diameter;
    multiple transmission cores arranged symmetrically within the central region of the cladding and extending parallel to a central axis of the multi-core optical fiber;
    a trenched area around each of the multiple transmission cores, wherein the trenched area has a first refractive index that is higher than a second refractive index of the multiple transmission cores; and
    multiple alignment cores arranged within the cladding, extending parallel to the central axis of the multi-core optical fiber and near the outside diameter of the cladding, wherein the arrangement permits each of the multiple alignment cores to be visible through a side view of the cladding,
    wherein, when an end of the multi-core optical fiber is mated to another end of another multi-core optical fiber to form a mating interface, alignment of the multiple alignment cores with other multiple alignment cores of the other multi-core optical fiber at the mating interface causes the multiple transmission cores and other multiple transmission cores of the other multi-core optical fiber to also be aligned at the mating interface, and
    wherein each of the trenched areas causes radiation leaks, from one of the multiple transmission cores, at the mating interface to be redirected back into one of the other multiple transmission cores of the other multi-core optical fiber.

2. The multi-core optical fiber of claim 1, wherein the cladding has a third refractive index that is lower than the second refractive index of the multiple transmission cores.

3. The multi-core optical fiber of claim 1, wherein the each of the multiple alignment cores are of a different color than the cladding.

4. The multi-core optical fiber of claim 3, wherein at least one of the multiple alignment cores has a different color than another of the multiple alignment cores.

5. The multi-core optical fiber of claim 1, wherein at least one of the multiple alignment cores has a different diameter than another of the multiple alignment cores.

6. The multi-core optical fiber of claim 1, wherein the multiple alignment cores include exactly three alignment cores.

7. The multi-core optical fiber of claim 1, wherein the multiple alignment cores include two or four alignment cores.

8. The multi-core optical fiber of claim 1, wherein the multiple alignment cores are spaced in a radially symmetrical arrangement about the central axis of the multi-core optical fiber.

9. The multi-core optical fiber of claim 1, wherein the multiple alignment cores are spaced in a radially asymmetrical arrangement compared to the central axis of the multi-core optical fiber.

10. A method comprising:
    forming an optical fiber blank by:
        providing a cladding material rod,
        drilling multiple axial holes in a central region of the cladding material rod for multiple transmission cores and trenched areas around each of the multiple transmission cores,
        drilling multiple axial holes near an outer circumference of the cladding material rod for multiple alignment cores,
        inserting a transmission core rod with trenching into each of the multiple axial holes in the central region, and
        inserting an alignment core rod into each of the multiple axial holes near the outer circumference; and
    drawing the optical fiber blank into a multi-core fiber of a standard fiber diameter, so that multiple alignment cores from the alignment core rods are visible through a side view of the cladding material rod of the multi-core fiber and pass light through an end of the multi-core fiber to verify alignment with another multi-core fiber.

11. The method of claim 10, wherein drilling the multiple axial holes near the outer circumference includes drilling the multiple axial holes near the outer circumference in a radially-symmetric pattern.

12. The method of claim 10, wherein drilling the multiple axial holes near the outer circumference includes drilling the multiple axial holes near the outer circumference in a radially-asymmetric pattern.

13. The method of claim 10, wherein drilling the multiple axial holes near the outer circumference includes drilling holes of at least two different diameters.

14. The method of claim 10, wherein inserting an alignment core rod into each of the multiple axial holes near the outer circumference includes inserting a glass rod of a different color than that of the transmission core rod and the cladding material rod.

15. The method of claim 14, wherein inserting an alignment core rod into each of the multiple axial holes near the outer circumference includes inserting a first alignment core rod of a first color and inserting a second alignment core rod of a second color that is different than the first color.

16. A method, comprising:
providing a first multi-core optical fiber having first multiple transmission cores, first trenched areas around each of the first multiple transmission cores, first multiple alignment cores, and a first end;
providing a second multi-core optical fiber having second multiple transmission cores, second trenched areas around each of the second multiple transmission cores, second multiple alignment cores, and a second end;
mating the first end to the second end to form a mating interface; and
aligning the first multiple alignment cores of the first multi-core optical fiber with the second multiple alignment cores of the second multi-core optical fiber using a side view of the mating interface,
wherein aligning the first multiple alignment cores and the second multiple alignment cores causes the first multiple transmission cores to align with the second multiple transmission cores, and
wherein the first trenched areas cause radiation leaks from the first multiple transmission cores, at the mating interface, to be redirected back into the second multiple transmission.

17. The method of claim 16, further comprising:
verifying alignment of the first multiple alignment cores with the second multiple alignment cores by measuring connection losses of light passed through the first multiple alignment cores and the second multiple alignment cores; and
securing the mating interface using a mechanical fitting or an adhesive bond.

18. The method of claim 16, wherein the first multiple alignment cores are a different color than a color of a cladding for the first multi-core optical fiber and the second multi-core optical fiber.

19. The multi-core optical fiber of claim 1, wherein each of the multiple alignment cores passes light through an end of the multi-core fiber.

20. The method of claim 10, wherein, when an end of the multi-core fiber is mated to another end of the other multi-core fiber to form a mating interface, alignment of the multiple alignment cores with other multiple alignment cores of the other multi-core fiber at the mating interface causes the multiple transmission cores and other multiple transmission cores of the other multi-core fiber to also be aligned at the mating interface, and
wherein each of the trenched areas causes radiation leaks, from one of the multiple transmission cores, at the mating interface to be redirected back into one of the other multiple transmission cores of the other multi-core fiber.

* * * * *